Jan. 5, 1965        M. R. STIGLITZ ETAL        3,164,768
            GARNET MICROWAVE PULSE GENERATOR
                    Filed Nov. 16, 1960
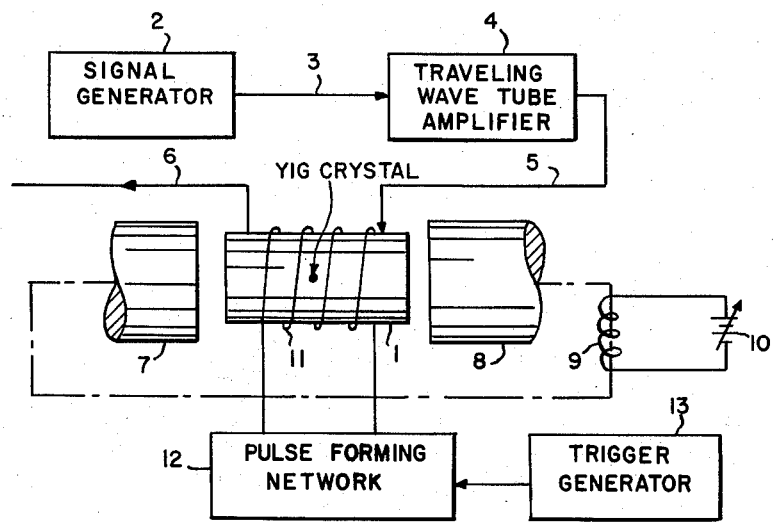
                                    INVENTORS
                                M.R. STIGLITZ
                                F.R. MORGENTHALER
                            BY
                                    ATTORNEY
                                    AGENT

United States Patent Office 3,164,768
Patented Jan. 5, 1965

3,164,768
GARNET MICROWAVE PULSE GENERATOR
Martin R. Stiglitz and Frederic R. Morgenthaler, Waltham, Mass., assignors to the United States of America as represented by the Secretary of the Air Force
Filed Nov. 16, 1960, Ser. No. 69,778
4 Claims. (Cl. 321—69)
(Granted under Title 35, U.S. Code (1952), sec. 266)

The invention described herein may be manufactured and used by or for the United States Government for governmental purposes without payment to us of any royalty thereon.

The purpose of this invention is to provide apparatus for the generation of short pulses of very high frequency energy.

The generator utilizes a crystal of the ferromagnetic material yttrium iron garnet $3Y_2O_3 5FE_2O_3$, abbreviated YIG, situated within a transmission line device, either resonant or non-resonant, where it is subjected to a microwave signal and a continuous magnetic field. When a pulsed magnetic field is applied along the direction of the continuous magnetic field pulses of microwave energy of higher frequency than the microwave signal are generated.

Referring to the single figure of the drawing for a more detailed description of a specific embodiment of the invention, 1 represents an enclosed transmission line type device such, for example, as a short section of coaxial transmission line or wave guide. The device 1 may be resonant, i.e. a resonant cavity, or it may be non-resonant. Situated within device 1 is a single crystal sphere of YIG which, in the specific embodiment described, may have a diameter of 1.5 mm. A microwave signal having a frequency of 3000 mc./s. is produced by generator 2 and applied over transmission line 3 to traveling wave amplifier 4. The microwave output of this amplifier is applied over transmission line 5 to device 1. An output transmission line 6 is also coupled to device 1. The manner of coupling lines 5 and 6 to device 1 will depend upon the type of transmission lines used and the construction of device 1.

The YIG crystal within device 1 is subjected to a continuous magnetic field by a direct current electromagnet having pole pieces 7, 8 and a magnetizing coil 9 energized from a direct current source of adjustable voltage 10. Since device 1 is constructed of a non-magnetic material, this produces a uniform axial magnetic field in the space enclosed by device 1 and containing the YIG crystal. The strength of this field is adjusted to the proper value for resonance of the YIG crystal at 3000 mc./s. (approximately 1100 gauss).

A low impedance coil 11 surrounds the device 1 and is fed with pulses of current from a pulse forming network 12 triggered by a trigger pulse generator 13. The current pulses were of 1 to 2 $\mu$sec. duration with a rise time of .1 $\mu$sec. and of such magnitude as to produce magnetic pulses within device 1 of up to 1200 gauss. The direction of flux is preferably the same as the direction of the continuous field.

When the coil 11 is pulsed a pulse of high frequency energy appears in output transmission line 6. The frequency of the energy in the output pulses has been found to be from 280 mc./s. to 1280 mc./s. above the driving energy frequency of 3000 mc./s. With a magnetic pulse of approximately 100 gauss, device 1 in the form of a resonant cavity turned to 3000 mc./s. and an input from amplifier 4 of 240 mw., pulses of 3280 mc./s. and .25 $\mu$sec. duration at a power level of 10 dbm have been obtained. Using a non-resonant transmission line for device 1 and a magnetic pulse of 500 gauss, pluses of 4300 mc./s. at a power level of 20 dbm were obtained. When the R.F. pulses were observed on a dual trace oscilloscope along with the current pulse in coil 11, the R.F. pulses were seen to have sharp peaks, especially at the higher frequencies. The generated R.F. pulses were also observed to occur at the leading edge of the current pulse when the pulsed field was in the same direction as the continuous field and at the trailing edge or decay portion when the fields were in opposite directions. It was further observed that when the continuous field produced by the electromagnet 7–8 made an angle greater than 0° and less than 90° with the axis of device 1 both R.F. pulses were generated simultaneously at a combined power equal to a single pulse.

We claim:

1. A microwave pulse generator comprising: an enclosed transmission line type device; means for applying high frequency energy to said device; a crystal of a ferromagnetic material in said device, said crystal having no dimension exceeding a small fraction of the wavelength of said energy; means for establishing a continuous magnetic field in said device of such density as to cause said crystal to resonate at the frequency of said energy; means for superimposing a pulse of magnetic flux on said field that is uniform and unidirectional throughout said crystal and that has a duration many times greater than the period of said energy, whereby pulses of microwave energy of frequency higher than that of the high frequency energy applied to said device are generated in said device; and an output circuit for said microwave pulses coupled to said device.

2. A microwave pulse generator comprising: an enclosed transmission line type device; means for applying high frequency energy to said device; a crystal of yttrium iron garnet in said device; said crystal having no dimension exceeding a small fraction of the wavelength of said energy; means for establishing a continuous magnetic field in said device of such density as to cause said crystal to resonate at the frequency of said energy; means for superimposing a pulse of magnetic flux on said field that is uniform and unidirectional throughout said crystal and that has a duration many times greater than the period of said energy, whereby pulses of microwave energy of frequency higher than that of the high frequency energy applied to said device are generated in said device; and an output circuit for said microwave pulses coupled to said device.

3. A microwave pulse generator comprising: means forming a resonant cavity; means for applying high frequency energy to said cavity; a crystal of yttrium iron garnet in said cavity, said crystal having no dimension exceeding a small fraction of the wavelength of said energy; means for establishing a continuous magnetic field in said cavity of such density as to cause said crystal to resonate at the frequency of said energy; means for superimposing a pulse of magnetic flux on said field that is uniform and unidirectional throughout said crystal and that has a duration many times greater than the period of said energy, whereby pulses of microwave energy of frequency higher than that of the high frequency energy applied to said cavity are generated in said cavity; and an output circuit for said microwave pulses coupled to said cavity.

4. A microwave pulse generator comprising: a short length of high frequency enclosed transmission line; means for applying high frequency energy to one end of said transmission line; a crystal of yttrium iron garnet in said transmission line, said crystal having no dimension exceeding a small fraction of the wavelength of said energy; means for establishing a continuous axial magnetic field in said transmission line of such density as to cause said crystal to resonate at the frequency of said energy; means for imposing a pulse of magnetic flux on said field that is uniform and unidirectional throughout said crystal and that has a duration many times greater than the period of said energy, whereby pulses of microwave energy of frequency higher than that of the high frequency energy applied to said transmission line are generated in said transmission line; and an output circuit for said microwave pulses coupled to the other end of said transmission line.

References Cited by the Examiner
UNITED STATES PATENTS

| | | | |
|---|---|---|---|
| 2,798,205 | 7/57 | Hogan | 333—24 |
| 2,873,370 | 2/59 | Pound | 333—24 |
| 3,012,203 | 12/61 | Ping King Tien | 321—69 |

OTHER REFERENCES

Farrar: "Journal of Applied Physics," March 1958, pages 425–426.

LLOYD McCOLLUM, Primary Examiner.

ELI J. SAX, Examiner.